April 21, 1964 A. C. MOORE ETAL 3,130,390

MAGNETIC STORAGE DEVICES

Filed May 22, 1959

Arthur Cyril Moore
Alexander Scott Young
Inventors
By Cushman, Darby & Cushman
Attorneys

United States Patent Office 3,130,390

Patented Apr. 21, 1964

3,130,390

MAGNETIC STORAGE DEVICES

Arthur Cyril Moore, Malvern Link, and Alexander Scott Young, Malvern, England, assignors, by mesne assignments, to International Business Machines Corporation, New York, N.Y., a corporation of New York Filed May 22, 1959, Ser. No. 815,016
Claims priority, application Great Britain May 27, 1958
9 Claims. (Cl. 340—174)

Figure 1:
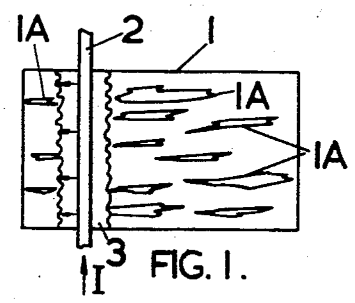

This invention relates to magnetic storage devices.

Magnetic storage devices of several types are currently known and in use for storing information in binary form; these devices are generally used in conjunction with electronic apparatus such as digital computers.

A commonly used device is the ring core made of magnetic material having a magnetic characteristics of the so-called rectangular hysteresis loop type. The magnetic state of such a core can be driven from one saturation state to another by passing a suitable energising current through a conductor-wire threaded through it. Conveniently such cores are assembled in a two-dimensional matrix through which energising and pick-up wires are threaded parallel to orthogonal axes so that half-level energising currents applied to two conductor wires each parallel to different axes energise fully only the one ring core threaded by them both. Three dimensional matrices are also possible.

These ring-cores are small in size and must be supported in their matrix configuration so that their assembly into a matrix and their threading is a matter of some difficulty. There are also numerable problems in their manufacture in quantity. Moreover, although the ring-cores are small, assemblies of them are still larger than is desirable.

It is an object of the present invention to provide an improved magnetic storage device.

It has been discovered that, if a thin layer of a magnetic material laid down on a suitable substrate is magnetised in a direction along its surface by a current carried across the surface by a conductor positioned near it, only the region of the layer about the wire is magnetised no matter how far the surface extends; and this magnetisation can be reversed by reversing the direction of the current in the conductor; moreover when two conductors are positioned close to the surface and side-by-side for part of their lengths the layer will be magnetised, according to the configuration of the conductors, when the conductors are energised above a critical level end, at places where the two conductors are side-by-side, a correspondingly increased magnetisation will be obtained.

Accordingly the invention provides a magnetic storage device comprising a layer of magnetic material which is thin for domain walls to extend across the thickness and between opposing surfaces of the layer and for propagation of domain walls to take place substantially two-dimensionally parallel to the layer surfaces, and electrical conductor means for conducting current in paths in close proximity to and across the surface of the layer to establish desired magentisation states corresponding to the directions and configurations of the current paths, whereby the magnetisations established in the layer by currents flowing in the electrical conductor means are located, according to the configurations of the currents in their paths and determined in intensity by the magnetising components parallel to the surfaces of the layer induced from the conductor means and in direction according to the directions of the current flow.

Figure 2:
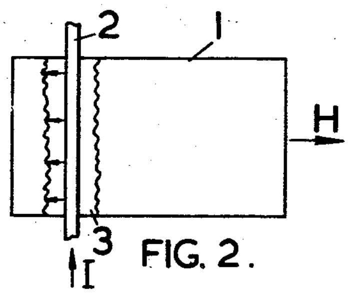
Figure 3:
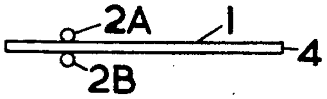
Figure 4:
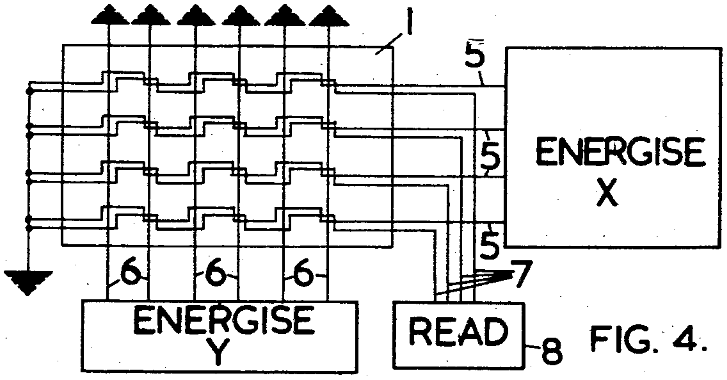
Figure 5:
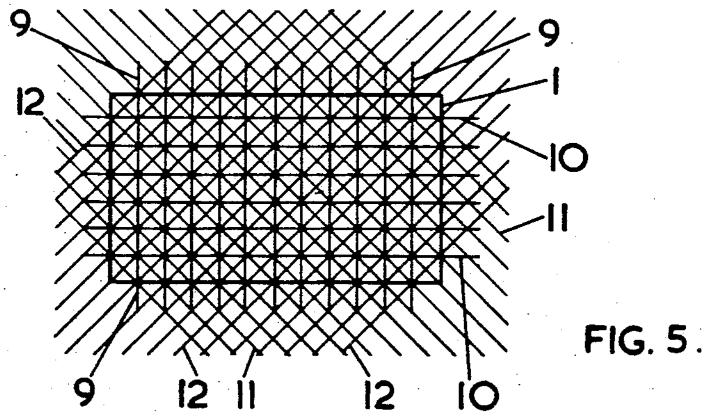

The phenomena to which the discovery relates will now be referred to in more detail and examples of storage devices will be described. Reference will be made to the accompanying drawings, in which:

FIG. 1 shows the effect of energising a wire conductor carrying current across the surface of a thin layer of magnetic material, FIG. 2 shows a similar effect to that shown in FIG. 1, except that the layer of magnetic material is polarised, FIG. 3 shows a side-view of an arrangement for a second energising wire in the arrangement of FIG. 1, FIG. 4 shows schematically a typical storage device, and FIG. 5 shows another possible arrangement of energising and reducing wires for a thin layer magnetic storage device.

If the surface of a piece of unmagnetised magnetic material is examined closely domain walls can be determined where the direction of magnetisation of individual particles of the material change direction at the surface. Domain walls may exist in general directions in the bulk of the material. Thus a three-dimensional phenomena is seen. In an unmagnetised material the many small domains of opposing magnetisation defined by the domain walls are mutually neutralised overall. When the material is magnetised a net component due to the domains exists in one direction, the direction of magnetisation.

If, however, a thin layer of magnetic material, say of the order of 1,000 Angstrom units in thickness, is applied to a non-magnetic substrate such as glass no domain walls would be possible parallel to the surface but would exist normal to the surface. Thus a two-dimensional phenomenon is observed in a thin layer; the thinness of the layer prevents any change of magnetisation by propagation of domain walls normal to the surface. If a conductor carrying current above a critical level dependent upon the material and the geometry is located close to the surface of the layer the layer will be magnetised in one direction only parallel to its surface and in the region of the layer about the conductor wire. This is shown in FIG. 1 where a layer 1 exhibiting domain walls 1A has a current-carrying conductor 2 in close relation therewith; a region 3 results which is magnetised in the direction of the arrows shown; the current I in the conductor 2 is in the direction indicated.

If the layer 1 is magnetised uniformly overall in the direction of the arrow H, FIG. 2, a similar phenomenon is seen when the conductor 2 carries current across the surface of the layer 1.

Thus much information can be stored over the surface area of a thin layer of magnetic material by the use of many spaced conductors. Where it is desired to read out the information stored it is generally desirable to have an additional conductor for this purpose and this can conveniently be arranged as shown in FIG. 3, on the other side of a substrate 4 supporting the layer 1 and is shown as a conductor 2B which is opposite to an original conductor 2A.

Typically a layer is made of a nickel-iron alloy (80–20) and is deposited on a non-magnetic substrate, for example glass, by high-vacuum evaporation. This produces a layer of the type described with reference to FIG. 1.

In one example of a layer of the type described with reference to FIG. 2, the layer is magnetised in a given direction whilst high-vacuum evaporation takes place on to a heated substrate. When a layer magnetically polarised in this way is used, the coercive force is reduced and a faster change of direction of magnetisation of the magnetised region 3 can be obtained when the direction of the current in the conductor 2 is reversed.

Typically the component of the field in the surface of the layer, at the edges of the magnetised region 3 is 2–3 oersteds for nickel iron (80–20) material and 30 oersteds for pure iron.

A conductor-wire is preferably small in its dimension normal to the surface and is as close to the surface of the magnetic layer as can conveniently be arranged so that the magnetic field due to the wire produces the maximum component of magnetisation parallel to the surface in the layer. A typical thickness (diameter in the case of a circular wire) of wire was 0.325 mm. and the width of the region 3 was of the order of 1 mm.

FIG. 4 shows schematically a typical arrangement of energising and reading wires for a storage device using a thin magnetic layer. Energising wires 5 are positioned across the surface of the layer 1 and orthogonal energising wires 6 are also positioned across the surface. The wires 5 have a configuration adapted so that short lengths are parallel to the orthogonal wires 6 for short distances in the vicinities of the points where the wires 5 and 6 intersect. Read wires 7 are placed across the layer 1 parallel to and close to the wires 5. The energise wires 5 and 6 are each connected to earth at one end and to energise circuits X and Y respectively at their other ends. The read wires 7 are earthed at one end and connected to a read circuit 8 at the other.

In operation the energising of one of each of the energise wires 5 and 6 at equal levels below, and above half, the critical level will determine the state of magnetisation of a small area of the layer 1 only in the vicinity of the point where the two wires intersect. Thus a desired magnetisation state can be achieved at an intersection point by energising appropriate wires 5 and 6 at suitable levels.

The read circuit 8 detects change of magnetisation of the layer occurring at any intersection point along the read wires 7 and thus the state of the layer 1 in the vicinity of the intersection point is read by successively energising the wires 6 by means of the energises circuit Y and noting the signal observed in the read circuit 8 as each wire is energised. This energise and read arrangement is based on similar principles to those already known for magnetic stores employing ring cores but it will be appreciated that the advantage of the storage device which depends on the use of a thin magnetic layer is that the energise and read wires themselves determine the location of the portion of the layer whose magnetisation state represents stored information. Thus at initial setting up the positioning of the read and energise wires is relatively easy and need not be related to any particular area of the thin magnetic layer.

In order to avoid the necessity for bending energise and read wires to follow orthogonal energise wires for short lengths at their intersection it is proposed that a further arrangement be used as shown diagrammatically in FIG. 5. Read wires 9 and 10 in two sets, each set orthogonal to the other, are placed across the layer 1 and two sets of orthogonal diagonal wires 11 and 12 are also placed over the layer 1 to act as energise wires.

In operation appropriate ones of the energise wires 11 and 12 are energised in arbitrarily chosen directions to establish one magnetisation state at the desired intersection of the wires 9 and 10 and energised in opposite directions if it is required to establish an opposite magnetisation state at the same intersection. In each case it will be seen that the polarity of the signal induced into a wire of one set of the wires 9 and 10 will be determined according to the direction of a change of megnetisation at the intersection. Thus the necessary conditions to provide a store are satisfied.

Other resolutions of energisation and reading signals may of course be used. Again the wires are the only part of the arrangement which need by accurately aligned; provided, of course, that the thin layer of magnetic material is firmly fixed relative to the wires during operation its actual initial position is immaterial. Although two sets 9 and 10 of read wires have been shown only one set may be required in normal circumstances; two sets have been shown for sake of completeness and both are not necessarily required.

To achieve optimum results when a layer is used which has been deposited under the influence of a polarising field it may be necessary, in the initial setting-up only, to adjust the position of the layer relative to the direction of the energise and read wires.

For layers of most magnetic materials the thickness for the thin layer criterion to obtain any range between 500 and 2,000 Angstrom units and for the typical nickel-iron (80–20) material will be about 1,000 Angstrom units.

For high speed of switching the layer should preferably have a controlled preferred direction of magnetisation, low anisotropy and a low coercive force for rotation. Consequently the material used for the layer should have low crystalline anisotropy and low magnetostriction to ensure that no shape anisotropy occurs to induce a magnetic anisotropy in the preferred direction of magnetisation.

A nickel-iron alloy having zero magnetostriction in polycrystalline material has a composition of 83% nickel and 17% iron; an alloy having zero magnetocrystalline anisotropy has a composition of 82% nickel and 18% iron. Suitable materials for thin layers can be chosen from within this range and be near to having optimum characteristics. One easily available alloy of this kind is that containing 80% nickel and 20% iron.

We claim:

1. A magnetic storage device comprising a layer of magnetic material which is thin so that domain walls extend through the thickness of the layer between opposing surfaces, first and second sets of conductors for conducting current in paths in close proximity to and across the surfaces of the layer, the conductors of the first set crossing those of the second set to define a plurality of intersections in the plane of the layer, and the conductors of one set having portions at the intersections which are parallel to portions of the conductors of the other set whereby in operation each pair of two crossing conductors carrying a current of a pre-determined level establishes a discrete area of magnetisation at their intersection, the direction of magnetisation being determined in one of two possible senses by the directions of current flow therein.

2. A magnetic storage device comprising a layer of magnetic material which is thin so that domain walls extend through the thickness of the layer between opposing surfaces, two sets of mutually orthogonal wires which define intersections in the plane of the layer, and a third set of wires each of which bisect the angle between adjacent wires of the different orthogonal sets and pass through the intersections defined by the wires of the first two sets.

3. A magnetic storage device as claimed in claim 1, wherein further conductors are provided in close proximity to and across the surfaces of the layer for picking-up signals induced by changes of magnetisation of parts of the layer.

4. A magnetic storage device as claimed in claim 1, wherein the conductors include a third set of conductors provide in close proximity to and across the surfaces of the layer and having portions parallel to the aforesaid portions of the first and second sets for picking-up signals induced by changes of magnetisation of the discrete areas.

5. A magnetic storage device as claimed in claim 2, including a fourth set of wires orthogonal to the wires of the third set.

6. A magnetic storage device as claimed in claim 4, wherein said third set of conductors is positioned against opposite surfaces of said magnetic layer from said first set of conductors.

7. A magnetic storage device as claimed in claim 3 wherein the layer has a preferred direction of magnetisation and the portions of said first set of the conductors are located orthogonally to the preferred direction.

8. A magnetic storage device as claimed in claim 7 wherein the magnetic material of the layer is a nickel-iron alloy chosen from the range 83% nickel, 17% iron to 82% nickel, 18% iron.

9. A magnetic storage device as claimed in claim 8, wherein the nickel-iron alloy contains 80% nickel and 20% iron.

References Cited in the file of this patent

UNITED STATES PATENTS

| | | |
|---|---|---|
| 2,792,563 | Rajchman | May 14, 1957 |
| 2,919,432 | Broadbent | Dec. 29, 1959 |

OTHER REFERENCES

Publication IV, "Preparation of Thin Magnetic Films and Their Properties," from Journal of Applied Physics, August 1955, vol. 26, No. 8, pp. 975–980, #52A 340–174.

Proceedings of Eastern Joint computer Conference, Dec. 10–12, 1956 (64C), 340–174C.

Electrical Manufacturing, vol. 61, No. 1, January 1958, pp. 95–98 (71–A), 340–174C.

Electrical Manufacturing, pp. 56–60, February 1959 (89A), 340–174C.

Notice of Adverse Decision in Interference

In Interference No. 95,223 involving Patent No. 3,130,390, A. C. Moore and A. S. Young, MAGNETIC STORAGE DEVICES, final judgment adverse to the patentees was rendered July 16, 1968, as to claims 1, 3, 4 and 6.

[*Official Gazette September 24, 1968.*]